United States Patent [19]

Hawkins

[11] 3,917,015
[45] Nov. 4, 1975

[54] VEHICLE STEERING CONTROL
[75] Inventor: Royal R. Hawkins, Bloomington, Minn.
[73] Assignee: Honeywell Inc., Minneapolis, Minn.
[22] Filed: June 19, 1973
[21] Appl. No.: 371,434

Related U.S. Application Data
[62] Division of Ser. No. 172,333, Aug. 2, 1971, Pat. No. 3,848,690.

[52] U.S. Cl. .................... 180/6.48; 180/45; 404/84
[51] Int. Cl.² ....................................... B62D 11/04
[58] Field of Search ............ 180/6.48, 6.5, 44 F, 45, 180/79.2 R, 79.2 C; 404/84

[56] References Cited
UNITED STATES PATENTS

| | | | |
|---|---|---|---|
| 3,351,147 | 11/1967 | Williamson | 180/44 F |
| 3,540,360 | 11/1970 | Snow | 404/84 |
| 3,570,615 | 3/1971 | Guilbaud | 180/6.5 X |

*Primary Examiner*—Kenneth H. Betts
*Assistant Examiner*—John A. Pekar
*Attorney, Agent, or Firm*—Trevor B. Joike; Henry L. Hanson

[57] ABSTRACT

A steering system for a land vehicle wherein the right and left side are supported by independent supporting means, e.g. wheels or track units, embodying variable speed driving circuits capable of driving the right and left side supporting means of the machine at different speeds, a speed control for controlling the right and left variable driving means in the same direction by equal amounts to regulate in unison the speeds of the right and left side of the machine and a steering control, either manual or automatic, for relatively operating the right and left variable speed driving means to vary the speeds between the right and left side of the machine to effect steering.

6 Claims, 4 Drawing Figures

VEHICLE STEERING CONTROL

This is a division of application Ser. No. 172,333, filed Aug. 2, 1971, now U.S. Pat. No. 3,848,690.

This invention relates to systems for steering a machine or vehicle, especially a land vehicle, by driving the right and left sides of the machine at different speeds. By driving the two sides of the machine at different speeds, the side of the machine that is driven at a higher speed will exert a greater force on its side of the machine than will be exerted on the side of the machine driven at the lower speed. This force differential between the two sides of the machine will cause the vehicle to turn in such a direction that the side of the vehicle having the lower speed will be inside of that turn.

The invention accomplishes this form of steering by providing a separate variable speed driving system for each side of the machine and by providing a driving circuit for each of the motors capable of operating its associated motor at a variable speed. A speed control means is designed to operate the two driving circuits in the same direction and by equal amounts to drive the motors in unison; and, a steering control circuit is adapted to drive the two driving circuits relative to one another, i.e. by driving these circuits either antithetically or by holding one substantially constant and varying the other, to vary the relative speeds between the right and left side driving motors. This steering circuit may comprise a manual and/or automatic steering control. The automatic steering control is adapted to steer the vehicle from an external reference, such as a guide wire extending longitudinally beside the vehicle.

This invention is especially useful in connection with road graders and pavers but can be used with any other land vehicle wherein the vehicle can be turned by controlling the relative speeds between the right and left side of the vehicle. The system for effectuating turning may be either electrical or hydraulic.

In another embodiment of the invention, steering control can be effectuated both by turning the wheels or tracks of the machine and by controlling the relative speeds of the motors driving those wheels or tracks. When using this embodiment of the invention on a vehicle wherein four wheels or tracks are provided, it is important that the speeds of the two motors on one side of the machine be controlled relative to the speeds of the motors on the other side of the machine when the vehicle enters a turn.

The exact nature of this invention will be readily apparent from a reconsideration of the following specification relative to the annexed drawings.

DESCRIPTION OF THE PREFERRED EMBODIMENTS

Figure 1:
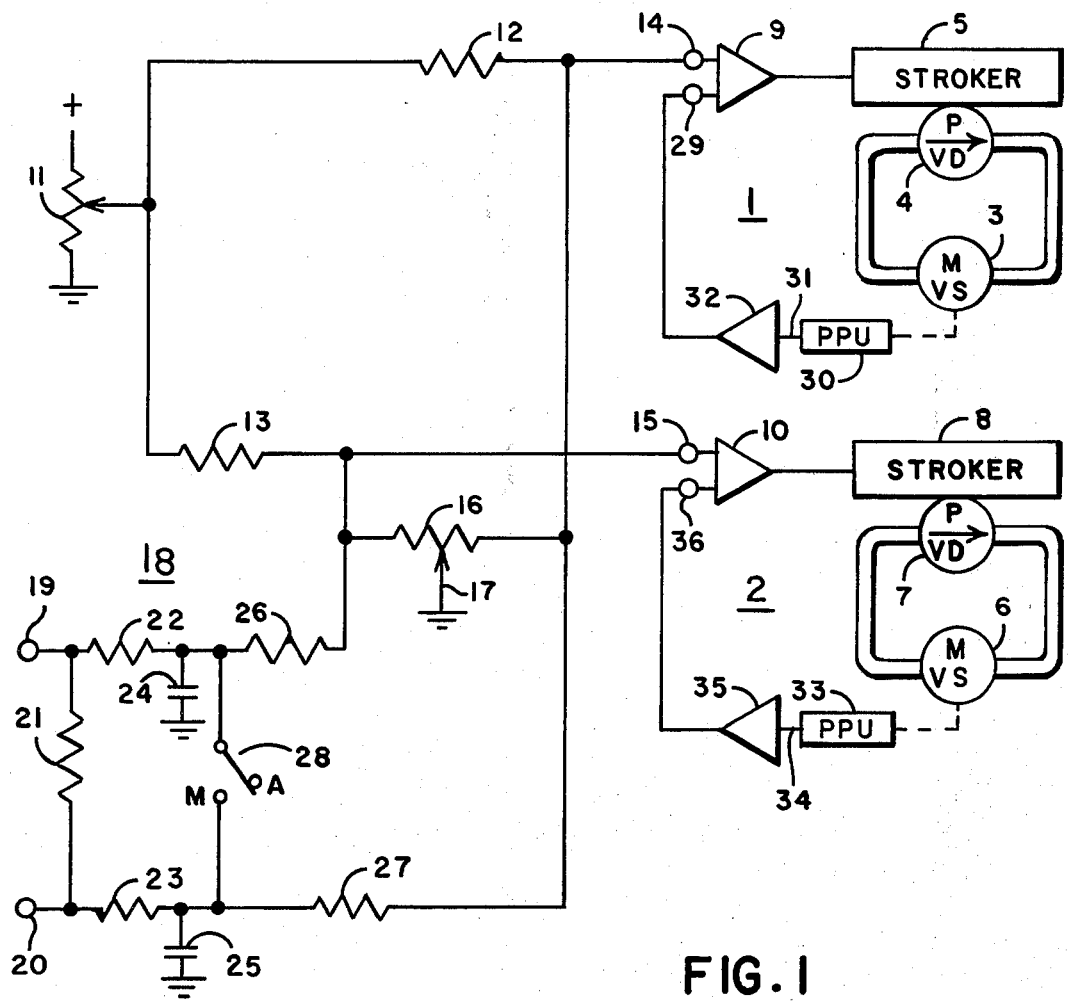
FIG. 1 is a schematic of the electrical circuit designed for either manual or automatic control of a vehicle.

Referring to FIG. 1, there is shown a variable speed driving means for the right side of the machine generally shown at 1 and a second variable speed driving means for the left side of the machine generally shown at 2. The right variable speed driving means comprises a hydraulic motor 3 adapted to drive the wheels or support means on the right side of the machine. The motor is supplied with hydraulic fluid from a variable displacement pump 4. A stroker 5 operates on the pump to control the amount of hydraulic fluid that the pump supplies the motor 3.

In a like manner, the left variable speed driving means comprises a hydraulic motor 6 for driving the left wheels of the vehicle or support means. The hydraulic motor 6 is supplied with hydraulic fluid from a pump 7, the output of which is controlled by a stroker 8.

The strokers 5 and 8 are driven by the outputs from amplifier 9 and 10 respectively. A speed control potentiometer 11 is connected between a positive DC source and ground and is connected, by way of its adjustable wiper arm, through resistors 12 and 13 to terminals 14 and 15 of amplifiers 9 and 10 respectively. The speed control potentiometer is adapted to provide a signal for controlling the speeds of hydraulic motors 3 and 6 in unison to effectuate speed control of the vehicle. Upon adjustment of potentiometer 11, like signals are applied to amplifiers 9 and 10 such that the hydraulic motors 3 and 6 are adjusted in the same direction and by an equal amount. Such an adjustment of these motors will adjust the speeds of the right and left side of the machines by equal amounts to adjust the speed of the vehicle.

A potentiometer 16 is connected between terminal 14 of amplifier 9 and terminal 15 of amplifier 10 for relatively adjusting the inputs to these two amplifiers. Associated with potentiometer 16 is a wiper arm 17 connected between the potentiometer 16 and ground. By adjusting the wiper arm 17, the DC levels to the inputs 14 and 15 are adjusted in a relative, e.g. opposite, manner. Thus, an adjustment of the potentiometer 17, causing relative adjustments of the DC inputs on terminals 14 or 15, causes a relative change in the output from the amplifiers 9 and 10 which changes the speeds of the variable speed motors 3 and 6 by a differential increment. Such operation of motors 3 and 6 drives one side of the vehicle slower than the other side to thus turn the vehicle.

For providing automatic steering of the vehicle, an interface network 18 is provided for connecting the automatic signal applied to terminals 19 and 20 to the inputs 14 and 15 of amplifiers 9 and 10 respectively. The steering control signals applied to terminals 19 and 20 may be provided by a sensing circuit which senses an external reference, e.g. a guide wire extending beside and longitudinally of the vehicle, and provides an appropriate signal to steer the vehicle. A sensing circuit capable of providing the automatic signal may be the W895A circuit manufactured by Honeywell Inc. which is disclosed in U.S. Pat. No. 3,674,094, assigned to the same assignee as the present invention and shown in FIG. 3 of that application. The output from the W895A produces time proportion pulses at terminals 19 and 20. Assuming that the sensor indicates that the vehicle is right on course according to the reference, the terminals 19 and 20 receive pulses such that the average DC level on terminals 19 or 20 are equal. The signal applied to terminals 19 and 20 is applied through a network comprising resistors 21, 22 and 23 and to filtering capacitors 24 and 25 which network converts the pulses into DC signals. The DC signals are applied through resistors 26 and 27 to the inputs 15 and 14 respectively. A switch 28 is provided which has a manual and an automatic terminal. When the switch is closed, the manual adjustment control potentiometer 16 may be operated to control the steering of the vehicle, and when the switch is open, the automatic steering signal will control the steering of the vehicle.

During the automatic mode of operation, the manual steering potentiometer 16 can be adjusted to its mid point, or slightly off mid point if a predetermined offset between the automatic signal and the actual position of the vehicle with respect to the reference is desired.

A feedback circuit is provided for each of the motors 3 and 6 to ensure that the motors are operating at the desired speed. The desired speed is represented by the signal applied to terminals 14 and 15. With respect to the right variable speed driving means 1, the feedback signal is applied to terminal 29 of amplifier 9. A pulse pickup unit 30 supplies pulses on its output line 31 of a frequency which depends upon the speed at which the output shaft of the variable speed motor operates. This signal on line 31 is supplied to a frequency to direct current converter 32 which supplies a direct current output of a level dependent upon the frequency of its input. The output of this frequency to direct current converter is applied to terminal 29. The amplifier 9 thus acts as a comparator.

Likewise a pulse pickup unit 33 senses the speed at which the output shaft of motor 6 operates and provides an output on line 34 of a frequency dependent upon the speed or the output shaft of motor 6. The output on line 34 is connected to the frequency to direct current converter 35 the output of which is connected to input terminal 36 of amplifier 10.

In operation, upon an adjustment of speed potentiometer 11, the DC signal applied to terminals 14 and 15 of amplifiers 9 and 10 respectively are adjusted in the same direction and by an equal amount. Thus, the speeds of motors 3 and 6 will be adjusted in the same direction to accordingly adjust the speed of the vehicle, and no turning will result. However, if the automatic sensing means senses a change or deviation from the reference or if the manual steering potentiometer 16 is adjusted, the DC levels to terminals 14 and 15 will be adjusted in a relative manner to adjust the speeds of the motors 3 and 6 in a relative manner to adjust the steering of the vehicle. Whenever the DC level applied to terminal 14 changes, the speed of the motor 3 will change thus causing the pulse pickup unit to change its output on line 31. The alteration in the output on line 31 causes a change in the output of amplifier 32 which will change the DC level applied to terminal 29 in a manner to approximately balance out the amplifier 9. The same operation will occur in the feedback circuit of the variable speed driving means 2.

Figure 2:
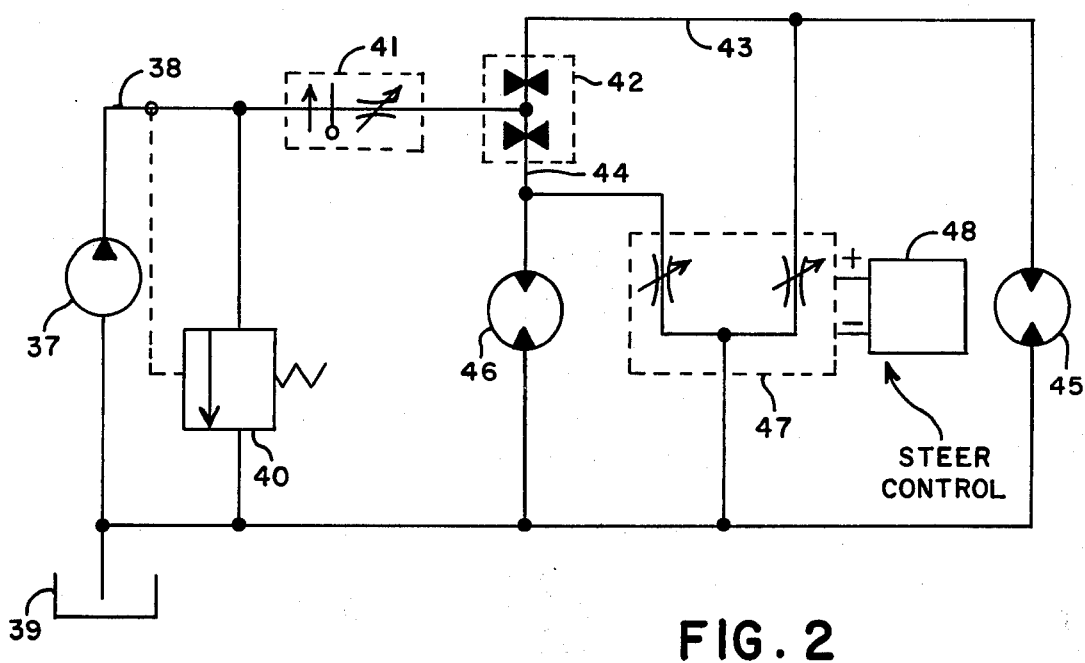
FIG. 2 is a schematic of the hydraulic counterpart of FIG. 1.

Referring to FIG. 2, there is shown the hydraulic counterpart of the electrical circuit depicted in FIG. 1. The hydraulic circuit comprises a source of power in the form of a pump 37 connected between supply line 38 and reservoir 39. Connected across the pump 37 is a relief valve 40 and connected to line 38 is a flow control valve 41. The output of flow control valve 41 is supplied to a 50—50 flow divider 42 which ensures that the output on lines 43 and 44 remain approximately equal. The hydraulic fluids in lines 43 and 44 are supplied respectively to hydraulic motors 45 and 46 which drive the right and left sides of the vehicle respectively.

Adjustment of flow control valve 41 is operative to adjust the speeds of motors 45 and 46 in an equal and similar manner to effectuate the speed control of the vehicle.

In order to adjust the speed at which motors 45 and 46 are driven for steering purposes, a servovalve 47 is provided which is operated from a steering control circuit 48. The steering control circuit 48 may comprise a manual adjustment potentiometer 16 shown in FIG. 1 and/or the automatic steering circuit comprising the W895A circuit to which reference has heretofore been made. The servo valve comprises a three-way servo valve which may be a spool valve in construction, but it is used as a dual two-way servo valve. The operation is such that when motors 45 and 46 are to be driven at equal speeds, the servo valve is in such a position that substantially the entire flow of hydraulic fluid through lines 43 and 44 passes through the motors 45 and 46. However, when the steering control circuit indicates that a steering maneuver is to be made, for instance to the right, part of the hydraulic fluid in line 43 is by-passed through the servo valve such that part of the hydraulic fluid through motor 45 is depeleted although the fluid flow to motor 46 remains substantially the same. This causes a drop in speed of the hydraulic motor 45 which operates to turn the vehicle to the right. The similar operation is effectuated when steering is to be controlled to the left.

In actual practice, although the 50—50 flow divider 42 tends to maintain the output on lines 43 and 44 in a 50—50 relationship, the outputs may change, as much as to yield a 48–52 relationship, when a steering operation is underway. The flow divider will tend to make the steering control system stiffer thus adding stability to the overall steering control circuit.

Figure 4:
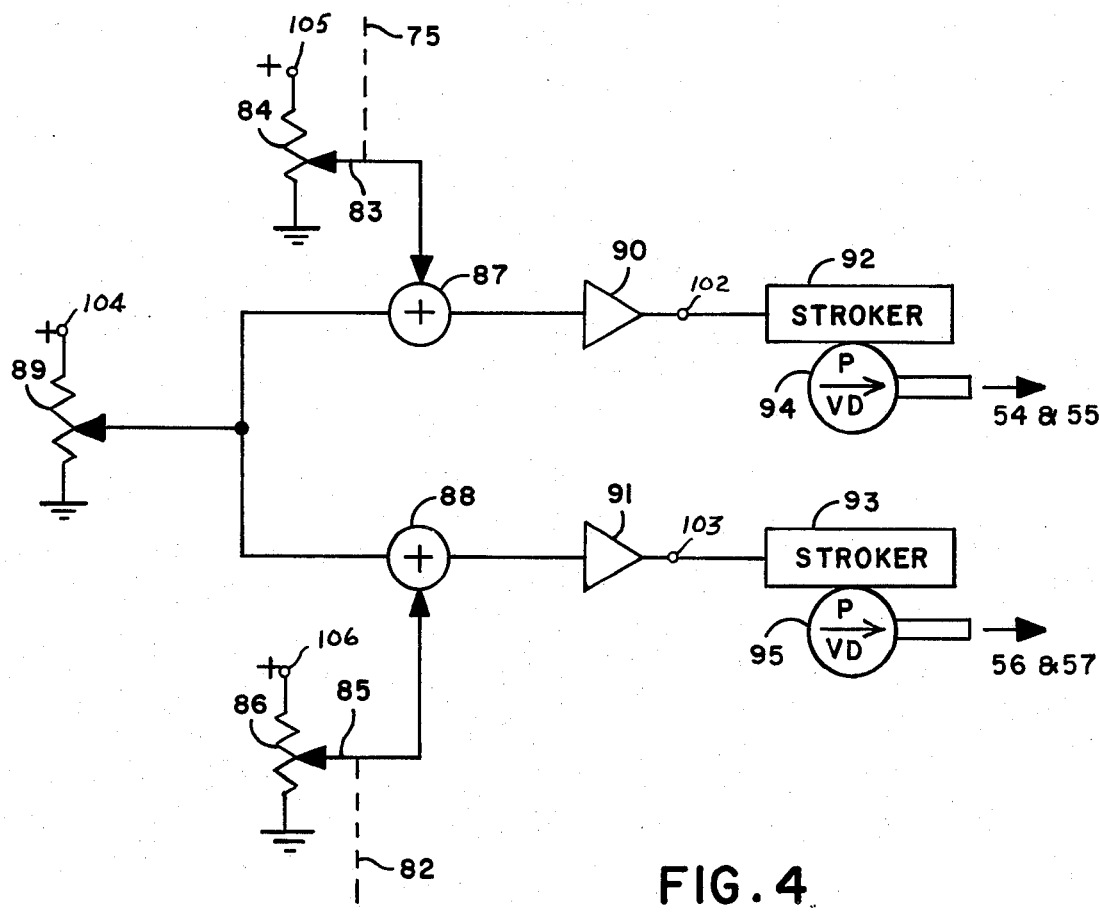
FIGS. 3 and 4 are drawings representing the elements necessary for both turning of the wheels or tracks as well as relative speed control for effectuating steering.
Figure 3:
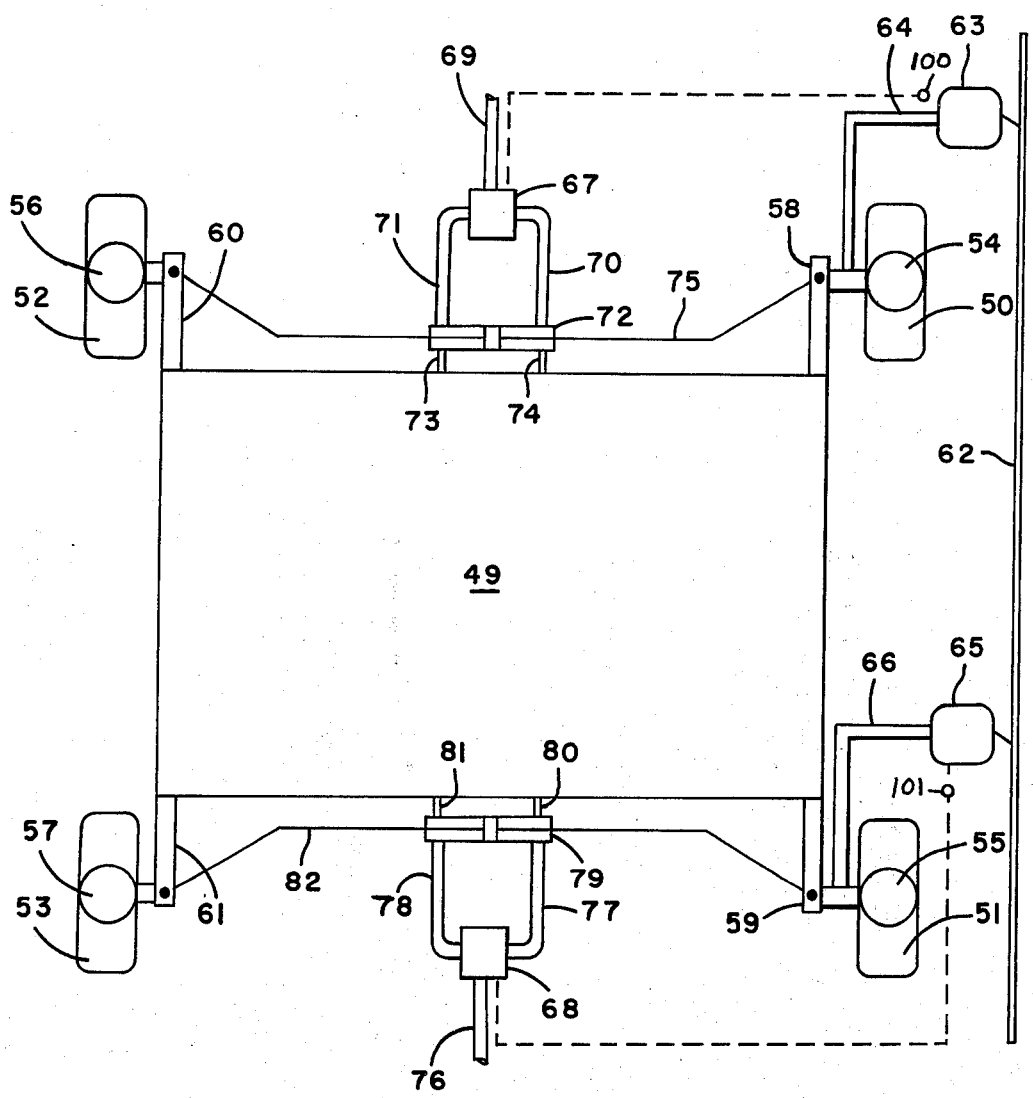

FIGS. 3 and 4 relate to another embodiment of the invention wherein steering is effectuated by both the turning of the support means, e.g. the wheels or tracks, of the vehicle as well as adjusting the relative speeds of these support means. The vehicle 49 is supported in the front by support means 50 and 52 and is supported in the rear by support means 51 and 53. Support means 50-53 are driven by hydraulic motors 54-57 respectively. The supporting means 50-53 are supported on the vehicle 49 by corner posts 58-61 respectively.

To establish a reference for purposes of automatic steering, a string line 62 extends longitudinally with and beside the machine 49. Associated with the string line 62 are a front sensor 63 mounted on the front wheel unit 50 by means of a connecting means 64 and a rear sensing unit 65 mounted on the rear supporting means 51 by a mounting means 66. Sensing units 63 and 65 may comprise the W895A sensing circuit as set out heretofore and the output terminals 100 and 101 of these units 63 and 65 control the hydraulic valves 67 and 68 respectfully as shown by the dashed lines. Hydraulic valve 67 has an input line 69 and output lines 70 and 71 which are adapted to control the steering cylinder 72. The steering cylinder 72 is supported on the machine by support means 73 and 74 and the cylinder 72 is operative to adjust the tie rod 75 which controls the turning of the front support means 50 and 52.

Similarly valve means 68 has an input 76 and two output lines 77 and 78 adapted to control the steering cylinder 79 which is mounted on the machine by support posts 80 and 81. The steering cylinder 79 controls a tie rod 82 adapted to turn the rear support means 51 and 53.

When the sensors 63 and 65 sense a deviation of the machine 49 from the reference established by guide line 62, they provide an output to their respective valves 67 and 68 to drive the steering cylinders 72 and 79 in a corresponding manner to effectuate turning of the support means 50–53 by operation of the tie rods 75 and 82.

Referring to FIG. 4, the circuit necessary to drive the hydraulic motors 54–57 at varying speeds to effectuate turning is disclosed. The tie rod 75 is operatively connected to wiper arm 83 of potentiometer 85 and tie rod 82 is operatively connected to wiper arm 85 of potentiometer 86. Both potentiometers are connected between a source of DC potential, having terminals 105 and 106, and ground. The output of potentiometer 84 which is taken off by wiper arm 83 is supplied to one input terminal of summing junction 87 whereas the output of potentiometer 86 which is taken off by wiper arm 85 is connected to one input of summing junction 88. The other inputs of summing junctions 87 and 84 are derived from a potentiometer 89, connected from input source terminal 104 to ground, which is designed to effectuate speed control of the vehicle by controlling the hydraulic motors 54–57 in unison. The outputs of summing junctions 87 and 88 are connected to amplifiers 90 and 91, respectively, the outputs of which are connected to output terminals 102 and 103 which are adapted to to be connected to control strokers 92 and 93. The strokers 92 and 93 operate to control the output of variable displacement pumps 94 and 95 respectively. The output of variable displacement pump 94 supplies hydraulic fluid to hydraulic motors 54 and 55 whereas the variable displacement pump 95 supplies hydraulic fluid to the hydraulic motors 56 and 57.

When sensor 63 and 65 sense a deviation of the machine 49 from the reference 62 indicating that the machine must turn, for instance, to the right, these sensors will produce outputs to the valves 67 and 68 which will operate the tie rods 75 and 82 in such a direction as to turn the vehicle to the right. When the tie rods 75 and 82 operate to turn the support units, wiper arms 83 and 85 will follow the operation of these tie rods and produce an output to their respective summing junctions 87 and 88 to control the DC level to the strokers in a relative manner to drive the right hydraulic motors 54 and 55 slower and drive hydraulic motors 56 and 57 faster respectively.

While this specification sets forth in detail the present and preferred embodiments, yet various modifications, alterations and changes may be resorted to without departing from the scope of the invention. For instance, electric motors may be substituted for the hydraulic motors which have been disclosed therein. If electric motors are used, electric drive circuitry must be used therewith. Other changes and modifications can of course be made.

The embodiments of the invention in which an inclusive property or right is claimed are defined as follows:

1. A system to control the steering of a vehicle having a right side and a left side and further having right and left, front and back propelling means capable of being driven at variable speeds, said system comprising:
   first variable speed driving means for providing an output signal to drive said right, front and back propelling means;
   second variable speed driving means for providing an output signal to drive said left, front and back propelling means;
   first and second output terminal means connected to said first and second variable speed driving means respectively for receiving said output signals and adapted to be connected to respective ones of said right and left, front and back propelling means for controlling the speed thereof;
   input terminal means adapted to be connected to a source of power;
   steering control means connected to said input terminal means for providing an output signal to control turning of said right and left, front and back propelling means;
   third output terminal means connected to said steering control means for receiving said output signal therefrom and adapted to control the turning of said right and left, front and back propelling means; and,
   transducer means connected between said terminals and said variable speed driving means adapted to be responsive to the turning of the propelling means controlled by said steering control means for adjusting said variable speed driving means,
   wherein said transducer means comprises a first potentiometer having a first resistive element connected to said input terminal means and a first wiper arm adapted to be responsive to the turning of said right front and left front propelling means, said wiper arm being connected from said first resistive element to said first variable speed driving means, said transducer means further comprising a second potentiometer having a second resistive element connected to said input terminal means and a second wiper arm adaptive to be responsive to the turning of said right back and left back propelling means, said second wiper arm being connected between said second resistive element and said second variable speed driving means, whereupon said propelling means are turned to control the direction of the vehicle and the speeds of the propelling means are differentially varied to aid in the steering of the vehicle.

2. The system according to claim 1 wherein said steering control means comprises sensing means adaptive to be responsive to a preset reference wherein said turning of said right and left, front and back propelling means is automatically controlled relative to said reference.

3. The system according to claim 2 further comprising a speed control potentiometer having a resistive element connected to said input terminal and a wiper arm connected to said first and second variable speed driving means.

4. A system to control the steering of a vehicle having a right side and a left side and further having right and left, front and back propelling means capable of being driven at variable speeds, said system comprising:
   first variable speed driving means for providing a first output signal to drive said right, front and back propelling means;
   second variable speed driving means for providing a second output signal to drive said left, front and back propelling means;
   a source of power;
   steering control means connected to said source of power for providing an output signal to control the turning of said right and left, front and back propelling means; and,
   transducer means connected between said source of power and said first and second variable speed driving means responsive to the turning of said propelling means for adjusting said first and second variable speed driving means, wherein said transducer means comprises a first potentiometer having a first resistive element connected to said source of power and a first wiper arm responsive to the turning of said right front and left front propelling means, said first wiper arm being connected from said first resistive element to said first variable speed driving means, said transducer means further comprising a second potentiometer having a second resistive element connected to said source of power and having a second wiper arm responsive to the turning of said right back and left back propelling means, said second wiper arm being connected between said second resistive element and said variable speed driving means, whereupon said propelling means are turned to control the direction of the vehicle and the speeds of the propelling means are differentially varied to aid in the steering of the vehicle.

5. The system according to claim 4 wherein said steering control means comprises a sensing means responsive to a preset reference wherein said turning of said right and left, front and back propelling means is automatically controlled relative to said reference.

6. The system according to claim 5 further comprising a speed control potentiometer having a resistive element connected to said source of power and wiper arm connected to said first and second variables speed driving means.

* * * * *